United States Patent [19]

Gerdes

[11] 3,974,936

[45] Aug. 17, 1976

[54] CLOSURE CAP

[75] Inventor: Theodor Gerdes, Langenfeld, Germany

[73] Assignee: Blau KG Fabrik fur Kraftfahrzeugteile, Langenfeld, Rhineland, Germany

[22] Filed: Sept. 18, 1975

[21] Appl. No.: 614,636

[30] Foreign Application Priority Data

Sept. 20, 1974 Germany.............................. 2444982
Jan. 24, 1975 Germany............................ 2502898

[52] U.S. Cl............................ 220/204; 220/DIG. 32
[51] Int. Cl.²......................................... B65D 51/16
[58] Field of Search ..... 220/202, 203, 204, DIG. 32

[56] References Cited

UNITED STATES PATENTS 3,809,282   5/1974   Blau et al............................ 220/204
3,820,680   6/1974   Friend.................................. 220/203

Primary Examiner—George T. Hall
Attorney, Agent, or Firm—Michael J. Striker

[57] ABSTRACT

A closure cap for containers or for use as a pipe socket closure including a rigid partition having a pair of valves acting in opposite directions for automatically compensating for pressure inequalities on either side of the partition. The valves include additional means for providing improved sealing support on the partition under the action of compression springs.

12 Claims, 5 Drawing Figures

CLOSURE CAP

The present invention relates to a closure cap for a container or which may be used as a pipe socket closure, in which excess internal or external pressure can be compensated automatically by valve members mounted in the closure cap.

Previously it is known a closure cap including a rigid insert plate defining vent holes provided therethrough, which vent holes are adapted to be opened and closed by valve members subject to the action of compression springs, at least one valve member allowing air or gas to pass through at least one vent hole in one direction and at least on other valve member allowing air or gas to pass through another vent hole in the opposite direction, the valve members being constituted by a sealing plate supported against annular toroidal supports pressed out of the insert plate, one such sealing plate being located above the insert plate and a second sealing plate being located below the insert plate such that when the pressure on opposite sides of the insert plate are not equal, one sealing plate is removed from its supports and air or gas passes through the thus opened vent hole.

In practice, it has become apparent that it is extremely difficult to mount sealing discs on valve members sufficiently securely so that a sealed seating of the sealing plate on the toroidal supports on the edge of the vent holes is ensured.

One problem is that since it is desired to automatically control the valves using compression spring pressure fluctuations, which cannot be predetermined, may occur to which the valve control means and the sealing seat are then exposed during operation.

The object of the present invention is therefore to provide special features and embodiments for the supporting seat of this type of disc-shaped seals, so that, independently of any pressures to be automtically compensated within containers or pipe sections an improved sealing support under constant spring pressure is ensured at all times for the seal during its return movement to its supporting collar.

Further features of the present invention reside in simplifying the mounting of the insert plate within the closure cap and in the appropriate formation of the vent holes provided in the insert plate.

According to the present invention there is provided a closure cap comprising a rigid insert plate having vent holes provided therethrough, which vent holes are adapted to be opened and closed by valve members subject to the action of compression springs, at least one valve member allowing air or gas to pass through at least one vent hole in one direction and at least one other valve member allowing air or gas to pass through another vent hole in the opposite direction, the valve members being constituted by a sealing plate supported against annular toroidal supports pressed out of the insert plate, one such sealing plate being located above the insert plate and a second sealing plate being located below the insert plate such that when the pressures on opposite sides of the insert plate are not equal, one sealing plate is removed from its supports and air or gas passes through the thus opened vent hole, wherein the sealing plates are pressed against said toroidal supports by a raised annular collar on the circumferential edge of a valve disc associated with each valve member, under the action of the compressing springs the collar being of somewhat larger diameter than the diameter of the toroidal supports on the insert plate.

The present invention will be described further, by way of example, with reference to the accompanying drawings, in which.

Figure 1:
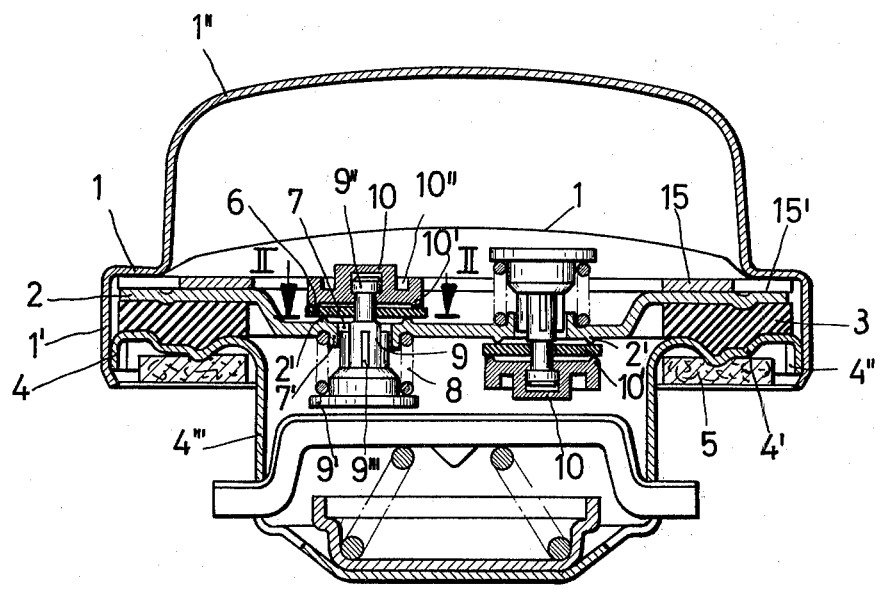
FIG. 1 is a section through a closure cap according to the present invention having two pressure compensating valves therein.

FIG. 1 shows a closure cap, as is used more particularly for petrol tanks of automotive vehicles, comprising an outer housing portion 1 having a downwardly extending overlapping rim portion 1', and a inner housing portion 4. The inner housing portion 4 has a flanged edge portion which engages with the rim portion 1' and is provided with ventilation channels 4''. An annular sealing ring 3 is supported between a hollowed portion 4' of the housing portion 4 and a rigid insert plate 2. The insert plate 2 is supported on the outer housing portion 1 via a further sealing insert 15 having cut-outs 15' around its outer edge. A normal sealing ring 5 is provided, which acts against a supporting edge of a vessel (not shown), to be sealed. In a known manner, a bayonet catch bridge member is mounted thereon which is subject to the action of a compression spring. The invention is, however, applicable to any kind of closure cap, such as screw threaded sockets to be fastened downwardly or even simple stopper closures.

The insert plate 2 is provided with two vent holes 7 through which valve members 9 extend. Each of the valve members 9 have an end flange portion 9' receiving a compression spring 8 supported against the plate 2, whilst the other ends 9'' of the valve members 9 extending to the other side of the plate 2 carries a terminating valve disc 10. Sealing plates 6 are supported between these valve discs 10 and annular toroidal supports 2' formed around the vent holes 7, said seals 6 being resiliently pressed against the toroidal supports 2' on the other side of the sealing plates 6 by collars 10' projecting axially from the peripheral edges of the valve discs 10. For this purpose the collars 10' are dimensioned so that their diameters are somewhat larger than the diameter of the toroidal supports 2'. By this means, the outer edges of the sealing plates 6 are now pressed from outside over and around the smaller diameter toroidal supports 2' by the somewhat larger diameter collars 10', so that a tight seat of the disc 6 is always ensured under the action of the spring 8. This seating is independent of the order of magnitude of the pressures acting on the valve control system for automatic compensation, since, during the resilient return movement of the valve discs 10, after the pressure compensation, the edge of the sealing discs 6 are drawn tight around the toroidal supports 2' resulting in practice in a type of labyrinth seal between collars 10' and toroidal supports 2'. This makes it possible for a valve control system, easily responding in this manner, to ensure a constantly good sealing seat again and again.

A further feature of the present invention insures good guidance of the valve members 9 in the vent holes 7, and also the achieving of the fastest possible pressure equalisation through these holes 7 upon the opening of the valve control system, the greatest possible flow cross-section being obtained between the valve member 9 and the vent holes 7. The holes 7 are coaxial with the valve member 9, whilst, the diameter of the central portion of the valve member 9 is made smaller than the diameter of the holes 7, and provided with longitudinal ribs 9''' disposed at intervals on the circumference of the central portion of the valve member 9 and extending radially outwardly. In the embodiment shown, the three ribs 9''', distributed at regular spaced intervals on the circumference of the valve member 9, are used for guiding the valve member 9 in the vent holes 7 defined by wall portions 7' in the plate 2, so that a correspondingly large flow cross-section is provided between these ribs 9''' when one of the valves is open. According to FIG. 1 the valve on the left opens with an internal excess pressure, and the valve on the right opens for an external excess pressure Finally, 10'' indicates annular recesses in the material which make it possible to form the valve disc 10 more easily, as also corresponding recesses may be provided in the flange portion 9' at the other end of the valve member 9, resulting in less weight.

Figure 2:
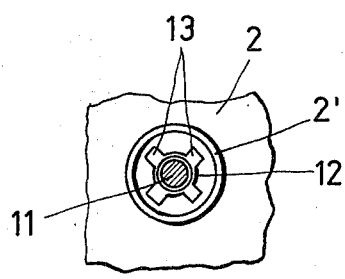
FIG. 2 shows a modification of the valve guide.

A modified embodiment is shown in FIG. 2, wherein the valve members are in the form of cylindrical spindles 11, and vent holes 12 are provided with channels 13 in the walls defining the vent holes distributed over the periphery for providing an increased flow cross-section. For the purpose of providing guide means, the wall portions 12, disposed between two channels 13, are drawn in so that the valve spindle 11 is guided by these partially cylindrical wall portions 12 in the same manner as in FIG. 1.

Figure 3:
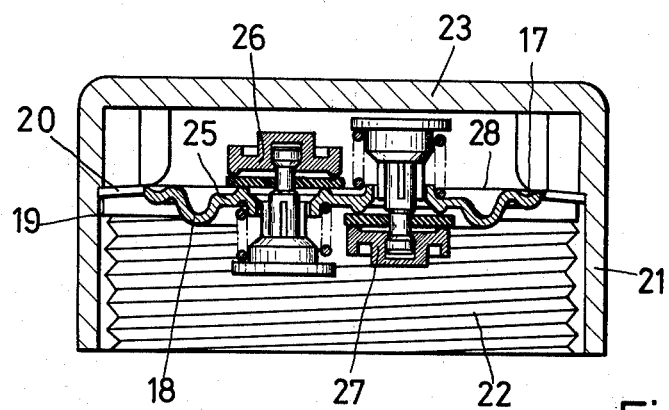
FIG. 3 shows a section through a screw closure cap according to the present invention.
Figure 4:
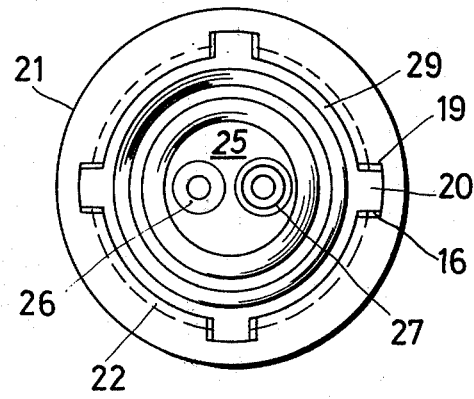
FIG. 4 is a view of the cap of FIG. 3 from below.
Figure 5:
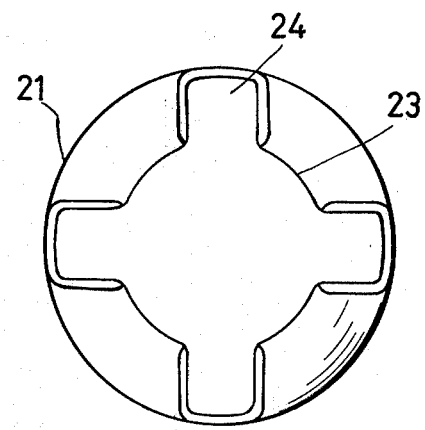
FIG. 5 is a view of the cap of FIG. 3 from above.

In FIGS. 3 – 5 an externally engaging downwardly extending screw cap is indicated by 21. The cap 21 has an inner thread 12 and on its outer top surface, has rib members 24 diametrically opposed to each other on the outside of the upper wall 23 of the cap. In the present case, the rib members 24 extend in two directions superimposed vertically one upon the other. Within the cap 21, a rigid insert plate 25 is provided carrying valve assemblies tightly closed under spring pressure identical to those shown in FIG. 1.

This plate 25 is mounted with its circular edge 29 in abutment against a radial inner surface 28 of the upper wall 23 of the cap 21, and is provided with spring clips 20, projecting from the edge 29 at uniform spaced intervals, which clips firmly engage resiliently against the inside of the cap 21. The clips 20 engage in recesses 19 provided in the cap 21 and are firmly held so that the plate 25 carrying the valves 26 and 27 is always kept centered. In order to increase the stability of the plate 25, the latter may also have concentric raised annular portions 18 or 17. Furthermore, the projecting spring clips 20 are held within the recesses 19, but a clearance is maintained between the sides of the recesses 19, so that ventilation spaces 16 are formed. These spaces 16 provide communication between the inside of the and the external atmosphere. The ventilation ducts 16 may be arranged, if desired, on both sides of the spring clips 20, a shown in FIG. 5, or alternatively a larger ventilation hole 16 may be arranged only on one side.

In the case of plastics material closure caps with the surface 28 moulded integrally on the cap and having cut-outs 19 distributed over the periphery, the plate 25 secured in position by pressing its radially metal spring clips 20 formed like claws into the material of the downwardly extending cap wall.

If necessary, slightly inwardly projecting ribs may be formed on the walls of the cap 21, within the axial cut-outs 19, for engaging behind the spring clips 20, so that in particular for metal closure covers locking engagement of the plate 25 with its spring clips 20 is ensured, in addition to the resilient claw connection within the cap 21.

The closure cap shown in the drawings, can be screwed tight on a supporting edge (not shown) and sealed using the screw thread and by providing a normal sealing ring on the raised annular portion 17 of the plate 25. In the case of a plastics material supporting edge, however, a tight seal can be achieved by abutting the circumferential edge of the plate 25 with the supporting edge of the vessel to be closed, since self-sealing plastic materials are known in many forms. Finally, the cap may be used for vessels of rubber or metal with a firmly and uniformly applied rubber or plastics seal all round the circumference of the plate 25.

I claim:

1. In a closure cap including a rigid insert plate defining vent holes, valve members supported in said vent holes, said valve members being adapted to open and close said vent holes subject to the action of compression springs supported on said rigid insert plate, at least one valve member allowing air or gas to pass through at least one vent hole in one direction and at least one other valve member allowing air or gas to pass through another vent hole in the opposite direction, the valve members being constituted by a sealing plate supported against annular toroidal supports pressed out of the insert plate, one such sealing plate being located above the insert plate and a second sealing plate being located below the insert plate such that when the pressure on opposite sides of the insert plate are not equal, one sealing plate is removed from its support and air or gas pass through the thus opened vent hole to equalise the pressure the improvement for the sealing, said improvement comprising providing raised annular collars on the circumferential edge of a valve disc associated with each valve member, whereby the sealing plates are pressed against said toroidal supports under the action of the compression springs, the collars being of somewhat larger diameter than the diameter of the toroidal supports on the insert plate.

2. A closure cap according to claim 1, wherein the raised annular collars exert a downward, encompassing pressure on the circumference of the sealing plates over the annular toroidal supports of somewhat smaller diameter than the collars.

3. A closure cap according to claim 1, in which the vent holes for the valve members are hollow cylindrical.

4. A closure cap according to claim 1, in which the diameter of a central portion of the valve members is made smaller than the diameter of the vent holes, and radially extending ribs are provided on the central portion of the valve member.

5. A closure cap according to claim 4, in which three radial ribs are distributed at regular spaced intervals over their circumference of the central portion of the valve member.

6. A closure cap according to claim 1, in which the valve member is cylindrical and the walls of the vent holes are provided with channels at spaced intervals, the wall portions between two channels forming a partial cylinder.

7. A closure cap according to claim 1, in which the insert plane is substantially circular and is mounted in the cap abutting against a radially inwardly projecting surface having recesses at spaced intervals, the insert plate having radially projecting spring clips engaging in these recesses with a lateral clearance, but resiliently and firmly pressed against the inner wall of the cap.

8. A closure cap according to claim 7, in which the cap is made of plastic material and the inwardly projecting surface is integrally moulded on the cap and the spring clips are made of metal and are pressed into the plastic of the inner walls of the cap.

9. A closure cap according to claim 7, in which transverse ribs are provided within the recesses on the cap, the ribs projecting slightly inwardly for engaging behind the spring clips as means of locking and retaining the insert plate.

10. A closure cap according to claim 7, in which the insert plate has concentric raised annular reinforcing portions.

11. A closure cap according to claim 7 in which a sealing ring is provided supported on the insert plate for sealingly engaging a flanged edge to be sealed.

12. A closure cap according to claim 7, in which a sealing ring is supported on a raised annular reinforcing portion of the insert plate.

* * * * *